United States Patent
Nair et al.

(10) Patent No.: US 6,763,711 B1
(45) Date of Patent: Jul. 20, 2004

(54) AIR FLOW SENSOR USING MEASUREMENT OF RATE OF HEAT LOSS

(75) Inventors: Rajesh Nair, Nashua, NH (US); Roger Holman, Acton, MA (US); David Gagnon, Brookline, NH (US); Owen R. Mann, Townsend, MA (US)

(73) Assignee: Degree Controls, Inc., Milford, NH (US)

( * ) Notice: Subject to any disclaimer, the term of this patent is extended or adjusted under 35 U.S.C. 154(b) by 0 days.

(21) Appl. No.: 09/418,791

(22) Filed: Oct. 15, 1999

(51) Int. Cl.$^7$ ................................................ G01F 1/68
(52) U.S. Cl. .................................................. 73/204.15
(58) Field of Search ........................ 73/204.15, 204.25, 73/204.23, 204.18, 204.19, 204.14, 204.16, 204.17, 204.2–204.26; 374/29, 31, 43

(56) References Cited

U.S. PATENT DOCUMENTS

| | | | | |
|---|---|---|---|---|
| 4,722,611 A | * | 2/1988 | Hultgren | 374/43 X |
| 4,787,251 A | * | 11/1988 | Kolodjski | 73/204.17 |
| 5,193,388 A | * | 3/1993 | Kleinhans | 73/204.14 |
| 5,394,746 A | * | 3/1995 | Williams | 73/204.15 |
| 5,629,482 A | * | 5/1997 | Vaitkus et al. | 73/204.24 |
| 5,918,473 A | * | 7/1999 | Gendron et al. | 374/43 X |

* cited by examiner

Primary Examiner—Harshad Patel
(74) Attorney, Agent, or Firm—Iandiorio & Teska

(57) ABSTRACT

An air flow sensor including a temperature dependent resistor device, a first circuit and a second circuit. The first circuit applies a voltage to the temperature dependent resistor device until it reaches a first temperature. The first circuit includes a first reference resistance leg, a first variable resistance leg including the temperature dependent resistor device, and a first comparator connected to both legs for determining when the temperature dependent resistor device reaches the first temperature. The second circuit includes a second reference resistance leg, a second variable resistance leg including the temperature dependent resistor device, and a second comparator connected to both legs for determining when the temperature dependent resistor device reaches a second temperature. A processor is connected to both the first and second comparators and programmed to time the period of time it takes the temperature dependent resistor device to change from the first temperature to the second temperature to determine the heat loss rate of the temperature dependent resistor device.

14 Claims, 3 Drawing Sheets

US 6,763,711 B1

AIR FLOW SENSOR USING MEASUREMENT OF RATE OF HEAT LOSS

FIELD OF INVENTION

This invention relates to an air flow sensor with a temperature dependent resistor device such as thermistor and a unique circuit for calculating the rate of heat loss by the temperature dependent resistor device.

BACKGROUND OF INVENTION

Hot body anemometry is a common method used in air flow measurement. A temperature dependent resistor device such as a thermistor or a hot wire is heated up to a temperature higher than the ambient temperature and the rate of heat loss is measured. The air flow over the hot device causes transfer of heat from the device to the air flowing over it. The rate of heat loss is directly related to the temperature difference between the hot body and the ambient air, the air flow velocity, the density of the air, the thermal properties of the hot body, and its geometry.

If the rate of heat transfer and the ambient air temperature can be measured, the air flow rate over the hot body can be computed in accordance with King's law, assuming that all of the other parameters are constant. The geometry and the material thermal properties such as the specific heat and the surface area of the hot body are constant. The ambient air temperature can be measured using sensors such as a thermistor, an RTD, or a thermocouple.

There are several methods used for determining the rate of heat loss from the temperature dependent resistor device. One common approach is to measure the power required to keep the device at a constant temperature, which is a measurement of its rate of heat loss. This method requires measuring the voltage across the device at a known resistance. An analog to digital converter is usually required to measure the voltage. Since the power drop across the device is proportional to the square of the voltage, a very precise analog to digital converter is required to measure the voltage to achieve an acceptable power measurement. Since power dissipation is proportional to the square of the voltage, an error in the voltage measurement results in a magnified error in the calculation of the heat loss rate. For example, a voltage measurement error of 5% leads to a 10% error in the heat loss rate measurement calculation.

In another approach, the voltage across the device with a constant current running through it is measured. In this example, the power dissipated can be measured as the product of the voltage and current through the device. However, the temperature of the device, which is an important parameter in determining air flow, varies with the power dissipated and hence the device temperature must be determined independently. Moreover, even this method requires an expensive and precise analog to digital converter.

SUMMARY OF THE INVENTION

It is therefore an object of this invention to provide an air flow sensor which does not require an analog to digital converter to determine the heat loss rate of the temperature dependent resistor device.

It is a further object of this invention to provide such an air flow sensor which does not require a separate sensor for measuring the temperature of the temperature dependent resistor device.

It is a further object of this invention to provide such a sensor which more accurately determines the heat loss rate of the temperature dependent resistor device.

It is a further object of this invention to provide such an air flow sensor which is easy to design and implement.

It is a further object of this invention to provide such an air flow sensor which allows the ambient air temperature to be measured by the temperature dependent resistor device itself, eliminating the need for a separate sensor.

It is a further object of this invention to provide such an air flow sensor which is voltage source independent.

This invention results from the realization that the rate of heat loss of a temperature dependent resistor device such as a thermistor, a variable required in order to calculate the air flow over the thermistor, can be measured without using a costly analog to digital converter which results in erroneous heat loss rate measurements, but instead by timing how long the thermistor takes to cool from a high temperature where the resistance is low to a lower temperature where the resistance is higher using one circuit which balances at the lower resistance value and another circuit which balances at the higher resistance value and comparators which determine when each circuit balances and thus when the thermistor is at the high temperature and then, after cooling, reaches the lower temperature. By monitoring the output of each comparator, the time it takes the thermistor to cool from the higher temperature to the lower temperature can be measured and the rate of heat loss of the thermistor calculated using as input the high and low temperatures and the cooling time.

This invention features an air flow sensor comprising a temperature dependent resistor device and a first circuit for applying a voltage to the temperature dependent resistor device until it reaches a first temperature. The first circuit typically includes a first reference resistance leg, a first variable resistance leg including the temperature dependent resistor device, and a first comparator connected to both legs for determining when the temperature dependent resistor device reaches the first temperature. There is also a second circuit including a second reference resistance leg, a second variable resistance leg including the temperature dependent resistor device, and a second comparator connected to both legs for determining when the temperature dependent resistor device reaches a second temperature.

A processor is connected to both the first and second comparators and programmed to time the period of time it takes the temperature dependent resistor device to change from the first temperature to the second temperature to determine the heat loss rate of the temperature dependent resistor device.

The temperature dependent resistor device may be a thermistor. The first variable resistance leg may include a low impedance resistor connected in series with the temperature dependent resistor device. The first reference resistance leg typically includes a plurality of resistors connected in series and the first reference resistance leg is connected in parallel with the first variable resistance leg.

The second reference resistance leg typically includes a plurality of resistors connected in series. The second variable resistance leg may include a high impedance resistor connected in series with the temperature dependent resistor device and the second reference resistance leg is connected in parallel with the second variable resistance leg. A first switch is connected between a voltage source and the first circuit and the processor is programmed to close the first switch until the temperature dependent resistor device reaches the first temperature and to then open the first switch. A second switch is connected between a voltage source and the second circuit and the processor is further programmed to close the second switch after the temperature dependent resistor device reaches the first temperature.

The air flow sensor may further include an ambient temperature sensing circuit including the temperature dependent resistor device. The ambient temperature sensing circuit may include a reference resistor and a capacitor connected in series with the temperature dependent resistor device. The processor is connected on a first line between the reference resistor and the capacitor and on a second line between the capacitor and the temperature dependent resistor device. The processor is programmed to apply a voltage on the first line and to detect the voltage on the second line until it reaches a predetermined level and to then apply a voltage on the second line and to detect the voltage on the first line until it reaches the predetermined level.

An air flow sensor in accordance with this invention includes a temperature dependent resistor device; means for applying a voltage to the temperature dependent resistor device until it reaches a first temperature; means for determining when the temperature dependent resistor device then cools to a second, temperature; and means for timing the period of time it takes the temperature dependent device to change from the first temperature to the second temperature to determine the heat loss rate of the temperature dependent resistor device.

The means for applying a voltage may include a first switch connected between a voltage source and a first circuit which includes a comparator connected to a first reference resistance leg and a first variable resistance leg including the temperature dependent resistor device, the comparator providing an output signal when the resistance of the temperature dependent resistor device causes the first circuit to balance. The means for determining may include a second switch between a voltage source and a second circuit which includes a comparator connected to a second reference resistance leg and a second variable resistance leg including the temperature dependent resistor device, the comparator providing an output signal when the resistance of the temperature dependent resistor device causes the second circuit to balance.

A method of determining the heat transfer rate of a temperature dependent resistor device in accordance with this invention includes the steps of heating the temperature dependent resistor device to a first temperature; allowing the temperature dependent resistor device to cool to a second temperature; measuring the period of time it takes for the temperature dependent resistor device to cool to the second temperature; and calculating the rate of heat transfer of the temperature dependent resistor device based on the measured period of time. The step of heating typically includes applying a first voltage across the temperature dependent resistor device until it reaches a first resistance value. The step of allowing the temperature dependent resistor device to cool includes applying a second voltage across the temperature dependent resistor device until it reaches a second resistance value. The step of measuring may include monitoring when the temperature dependent resistor device reaches the first resistance value and timing the time period it takes to reach the second resistance value.

BRIEF DESCRIPTION OF THE DRAWINGS

Other objects, features and advantages will occur to those skilled in the art from the following description of a preferred embodiment and the accompanying drawings, in which.

DETAILED DESCRIPTION

In accordance with King's law, the air flow rate over a temperature dependent resistor device such as a thermistor component of an air flow sensor is a function of the rate of heat loss ($\Delta H/\Delta t$) of the thermistor.

In the subject invention, the rate of heat loss is determined by heating the thermistor to a first temperature $T_H$, allowing the thermistor to cool to a second, cooler temperature $T_L$, measuring the period of time it takes for thermistor to cool to $T_L$, and calculating the rate of heat transfer according to the equation:

$$\frac{\Delta H}{\Delta t} = ms(T_H - T_L)/t \qquad (1)$$

where m is the mass of the thermistor, s is the specific heat of the thermistor, and ($T_H$–$T_L$) is the temperature drop in time t.

Figure 1:
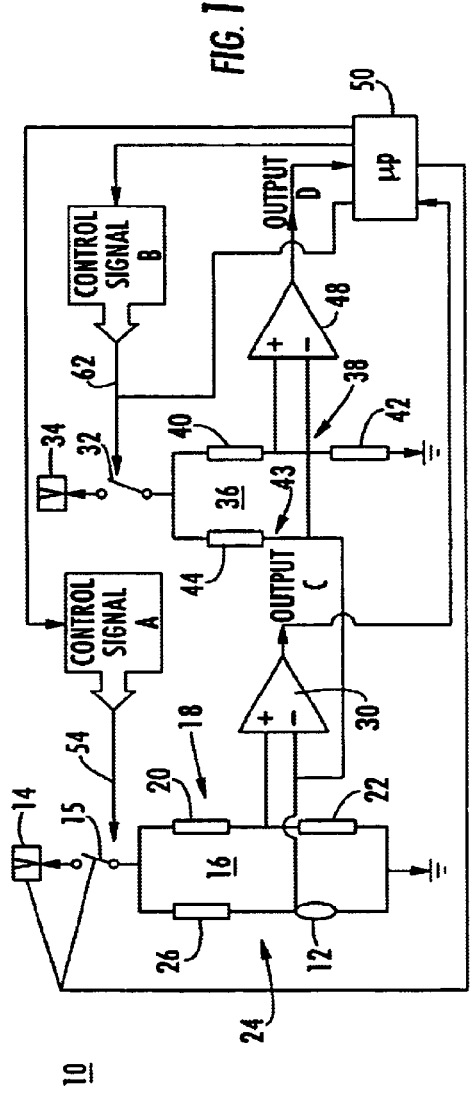
FIG. 1 is a representative circuit diagram of a portion of the air flow sensor of this invention.

In a preferred embodiment, air flow sensor 10, FIG. 1, includes some means for applying a voltage to thermistor 12 only until it reaches temperature $T_H$ such as switch 15 interconnecting voltage source 14 and circuit 16. Circuit 16 includes reference resistance leg 18 having resistors 20 and 22 connected in series and variable resistance leg 24 including thermistor 12 connected in series with low impedance resistor 26. Reference resistance leg 18 and variable resistance leg 24 are connected in parallel as shown and comparator 30 is connected to both legs as shown. Comparator 30 provides an output signal C to processor 50 when circuit 16 balances at the point where thermistor 12 reaches temperature $T_H$.

Air flow sensor 10 also includes means for determining when thermistor 12 cools to temperature $T_L$ such as switch 32 connected between voltage source 34 and circuit 36. Circuit 36 includes reference resistance leg 38 having resistors 40 and 42 connected in series. Circuit 36 also includes variable resistance leg 43 having high impedance resistor 44 connected in series with thermistor 12. Reference resistance leg 38 and variable resistance leg 43 are connected in parallel as shown and comparator 48 is connected to both legs 38 and 43 as shown. Comparator 48 provides an output signal D to processor 50 when circuit 36 balances at the point where thermistor 12 reaches temperature $T_L$.

Processor 50 includes means, such as a clock, for timing the period of time it takes for thermistor 12 to cool from temperature $T_H$ to temperature $T_L$ and is programmed to calculate the rate of heat loss of thermistor 12 according to equation (1) above. Stated another way, once circuit 16 balances, processor 50 times how long it then takes circuit 36 to balance.

Figure 2:
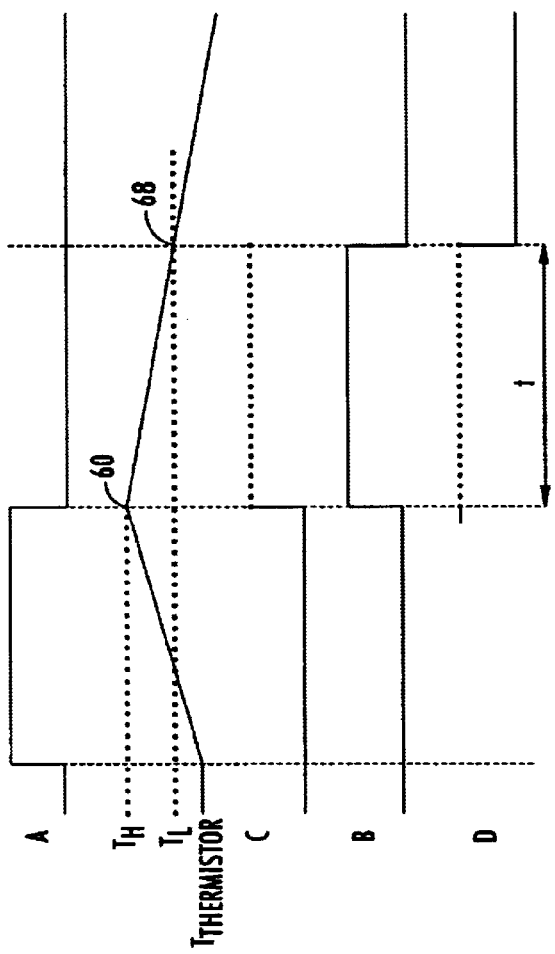
FIG. 2 is a signal timing chart showing the timing of the various signals processed by the microprocessor of the air flow sensor shown in FIG. 1.

Specifically, processor 50 is programmed to provide control signal A, FIG. 2 on line 54 which closes switch 15 connecting voltage source 14 to both variable resistance leg 24 and reference resistance leg 18 of circuit 16. Thermistor 12 then heats to temperature $T_H$ according to the equation:

$$W = IR^2_{thermistor} \quad (2)$$

Since thermistor 12 has a resistance $R_1$ at temperature $T_H$ (see FIG. 3), the resistance values of resistors 26, 20, and 22 are chosen such that circuit 16 balances at $R_1$. At this point, comparator 30 provides signal C to processor 50 which initiates a timing sequence. In one example, $R_1$ is 25Ω at temperature $T_H$ of 130° C.; resistor 26 is 24Ω, resistor 20 is 2 KΩ, and resistor 22 is 1 KΩ.

Thus, as shown in FIG. 2, the thermistor temperature $T_{thermistor}$ is at an ambient temperature until control signal A closes switch 15 whereupon the thermistor heats until it reaches temperature $T_H$ at point 60. Processor 50 then removes control signal A which opens switch 15. At the same time, processor 50, FIG. 1, provides control signal B on line 62 closing switch 32 and connecting circuit 36 to voltage source 34 (which may be the same as voltage source 14).

Figure 3:
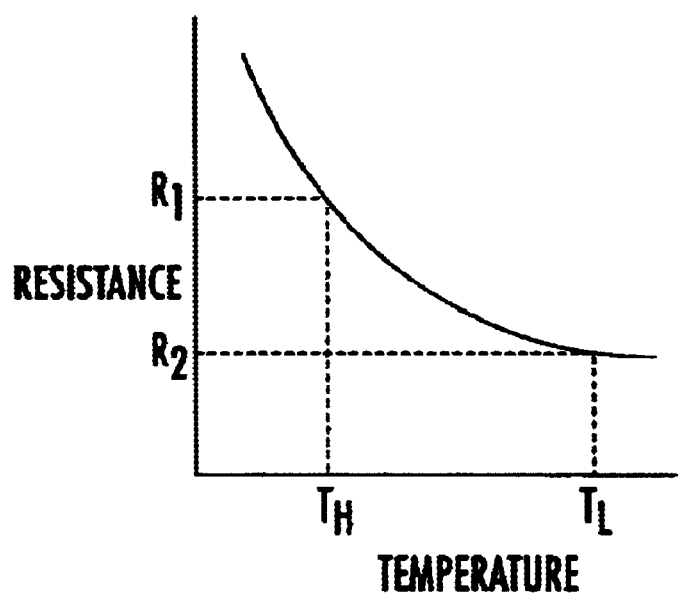
FIG. 3 is a graph showing the variation in the resistance values of the temperature dependent resistor device of the air flow sensor shown in FIG. 1 compared to the temperature of the temperature dependent resistor device.

The resistance values of resistors 40, 44, and 42 are chosen such that circuit 36 balances at $R_2$, the resistance value of thermistor 12 at temperature $T_L$, FIG. 3.

At this point, (68 in FIG. 2), comparator 48 provides signal D to processor 50 which stops the timing sequence. Time t, the period of time it took for thermistor 12, FIG. 1, to cool from $T_H$ to $T_L$ is now known. In one example, resistor 44 is 1 KΩ, resistor 40 is 1 KΩ, and resistor 42 is 25 KΩ. Since t is now known, processor 50 solves equation (1) above for ΔH/Δt, the heat rate loss of thermistor 12.

Equation (1) is now reduced to:

$$\frac{\Delta H}{\Delta t} = k/t \quad (3)$$

where k is a constant for a given resistor bridge and a given thermistor since the temperatures $T_H$ and $T_L$ are fixed and the thermal properties of the thermistor such as the mass and specific heat do not change. Hence, the cooling rate (rate of loss of heat) of the thermistor at a given temperature can be measured by turning on or off switches 15 and 32 and measuring the time period t.

Using King's law or any other equivalent calculation, the air flow rate over thermistor 12 can now be calculated by processor 50 provided the ambient temperature is known. Air flow sensor 10, FIG. 1, may include a separate ambient temperature measuring device with an output connected to processor 50 which is programmed to calculate the air flow rate over thermistor 12 according to King's law or, alternatively, thermistor 12 itself can be used to measure the ambient temperature as shown in FIGS. 4–6.

In this embodiment, thermistor 12 at the ambient temperature is connected in series with reference resistor $R_{REF}$ (e.g., 1 KΩ) and capacitor 72 (e.g., 0.1 μF). Processor 50 is programmed to first provide a +5 volt signal on line $L_1$, 74 and to monitor the voltage on line $L_2$, 76 until it reaches trigger point 78, FIG. 5, at time $t_1$.

Figure 4:
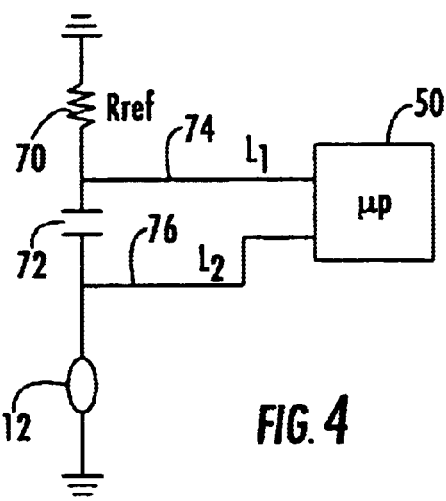
FIG. 4 is an exemplary circuit diagram for an ambient temperature sensing subcircuit in accordance with the air flow sensor design of this invention.
Figure 5:
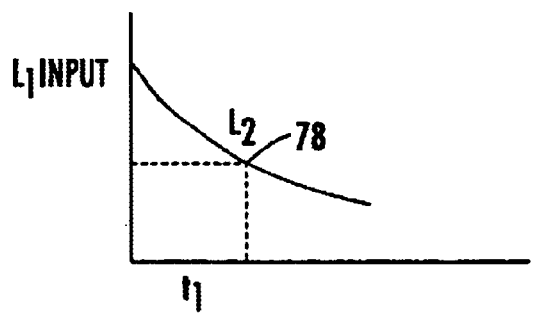
FIGS. 5 and 6 are graphs showing the operation of the circuit shown in FIG. 4.
Figure 6:
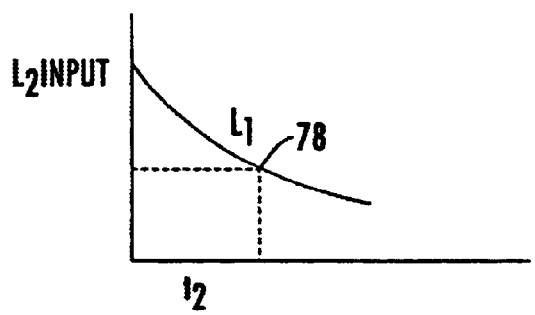

Next, processor 50, FIG. 4, provides a +5 volt signal on line $L_2$, 76 and monitors the voltage on line $L_1$, 74 until it reaches the same trigger point 78, FIG. 6 at time $t_2$.

Figure 7:
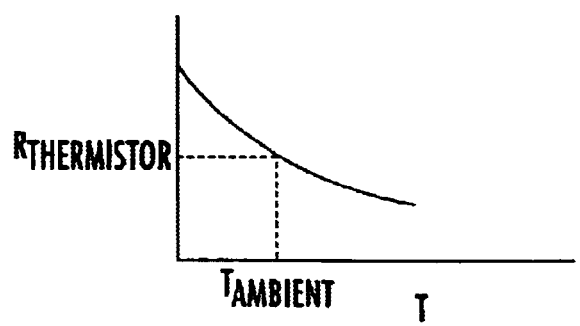
FIG. 7 is a graph showing how the ambient air temperature is determined in accordance with the circuit shown in FIG. 4.

By solving equation (4):

$$t_1/t_2 = R_{ref}/R_{thermistor} \quad (4)$$

for $R_{thermistor}$ and by knowing the manufacturer's data for the thermistor (see FIG. 7), $T_{ambient}$ can be determined by microprocessor 50, FIG. 4 and used along with the value of ΔH/Δt calculated as described above as input to the King's law equation to determine the air flow rate over thermistor 12, FIGS. 1 and 4.

Although in the above examples, the temperature dependent resistor device is shown to be a thermistor, any hot wire or RTD device or their equivalents may be used. In air flow sensor 10, FIG. 1, no analog to digital converter is required and processor 50 can be any standard microcontroller with input-output ports.

The accuracy of the air flow rate calculation is improved in contrast to sensors which incorporated an analog to digital converter wherein a +5% voltage measurement error led to a 10% error in the measurement of the heat loss rate.

Moreover, calibration of sensor 10, FIG. 1 can be accomplished by using known air flows and ambient temperatures to calculate time t, FIG. 2 and to then determine the constants of the King's law equation. In accordance with the subject invention, circuits 16 and 36, FIG. 1 are believed to constitute the best mode of carrying out the subject invention but analog and digital (even microprocessor based) equivalents will be evident to those skilled in the art. Moreover, the processor shown in FIGS. 1 and 4 may be a single microprocessor or any analog or digital equivalent. Therefore, "circuit" and "processor" as used herein are to be given their broadest reasonable interpretation.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. An air flow sensor comprising:
   a temperature dependent resistor device;
   a first circuit for applying a voltage to the temperature dependent resistor device until it reaches a first temperature, the first circuit including:
      a first reference resistance leg;
      a first variable resistance log including the temperature dependent resistor device; and
      a first comparator connected to both legs for determining when the temperature dependent resistor device reaches the first temperature;
   a second circuit including:
      a second reference resistance leg;
      a second variable resistance leg including the temperature dependent resistor device; and
      a second comparator connected to both legs for determining when the temperature dependent resistor device reaches a second temperature; and
      a processor connected to both the first and second comparators and programmed to time the period of time it takes the temperature dependent resistor device to change from the first temperature to the second temperature to determine the heat loss rate of the temperature dependent resistor device.

2. The air flow sensor of claim 1 in which the temperature dependent resistor device is a thermistor.

3. The air flow sensor of claim 1 in which the first variable resistance leg includes a low impedance resistor connected in series with the temperature dependent resistor device and the first reference resistance leg includes a plurality of resistors connected in series, the first reference resistance leg connected in parallel with the first variable resistance leg.

4. The air flow sensor of claim 1 in which the second reference resistance leg includes a plurality of resistors connected in series and the second variable resistance leg includes a high impedance resistor connected in series with the temperature dependent resistor device, the second reference resistance leg connected in parallel with the second variable resistance leg.

5. The air flow sensor of claim 1 further including a first switch connected between a voltage source and the first circuit, the processor programmed to close the first switch until the temperature dependent resistor device reaches the first temperature and to then open the first switch.

6. The air flow sensor of claim 1 further including a second switch connected between a voltage source and the second circuit, the processor further programmed to close the second switch after the temperature dependent resistor device reaches the first temperature.

7. The air flow sensor of claim 1 further including an ambient temperature sensing circuit including the temperature dependent resistor device.

8. The air flow sensor of claim 7 in which the ambient temperature sensing circuit includes a reference resistor and a capacitor connected in series with the temperature dependent resistor device.

9. The air flow sensor of claim 8 in which the processor is connected on a first line between the reference resistor and the capacitor and on a second line between the capacitor and the temperature dependent resistor device.

10. The air flow sensor of claim 9 in which the processor is programmed to apply a voltage on the first line and to detect the voltage on the second line until it reaches a predetermined level and to then apply a voltage on the second line and to detect the voltage on the first line until it reaches the predetermined level.

11. An air flow sensor comprising:
a temperature dependent resistor device;
means for applying a voltage to the temperature dependent resistor device until it reaches a first temperature, including a first switch connected between a voltage source and a first circuit;
means for determining when the temperature dependent resistor device then cools to a second, lower temperature, including a second switch connected between a voltage source and a second circuit; and
means for timing the period of time it takes the temperature dependent device to change from the first temperature to the second temperature to determine the heat loss rate of the temperature dependent resistor device.

12. The air flow sensor of claim 11 in which the means for applying a voltage includes a comparator connected to a first reference resistance leg and a first variable resistance leg including the temperature dependent resistor device, the comparator providing an output signal when the resistance of the temperature dependent resistor device causes the first circuit to balance.

13. The air flow sensor of claim 11 in which the means for determining includes a comparator connected to a second reference resistance leg and a second variable resistance leg including the temperature dependent resistor device, the comparator providing an output signal when the resistance of the temperature dependent resistor device causes the second circuit to balance.

14. A method of determining the heat transfer rate of a temperature dependent resistor device, the method comprising:
heating the temperature dependent resistor device to a first temperature by applying a first voltage across the temperature dependent resistor device until it reaches a first resistance value;
allowing the temperature dependent resistor device to cool to a second temperature by applying a second, lower voltage across the temperature dependent resistor device until it reaches a second resistance value;
measuring the period of time it takes for the temperature dependent resistor device to cool to the second temperature including monitoring when the temperature dependent device reaches the first resistance value and timing the period it takes to reach the second resistance value; and
calculating the rate of heat transfer of the temperature dependent resistor device based on the measured period of time.

* * * * *